United States Patent
Rockland

[15] 3,635,728
[45] Jan. 18, 1972

[54] QUICK-COOKING SOYBEAN PRODUCTS

[72] Inventor: Louis B. Rockland, Pasadena, Calif.

[73] Assignee: The United States of America as represented by the Secretary of Agriculture

[22] Filed: Mar. 26, 1968

[21] Appl. No.: 716,232

[52] U.S. Cl. ............................................99/98
[51] Int. Cl. ...........................................A23l 1/20
[58] Field of Search.....................................99/98

[56] References Cited

UNITED STATES PATENTS

| | | | |
|---|---|---|---|
| 2,584,150 | 2/1952 | Morris | 99/98 |
| 3,388,998 | 6/1968 | Pzai-Durrani | 99/98 |
| 3,318,708 | 5/1967 | Rockland et al. | 99/98 |
| 3,352,687 | 11/1967 | Rockland et al. | 99/98 |

*Primary Examiner*—A. Louis Monacell
*Assistant Examiner*—William Andrew Simons
*Attorney*—R. Hoffman, W. Bier and W. Takacs

[57] ABSTRACT

Process for treating soybeans to remove bitterness and other undesirable taste qualities, and to tenderize the beans so that they can be cooked in a short time, all the while retaining the integrity of the beans. The procedural steps include a conditioning of the beans by a brief contact with boiling water, followed by soaking in an aqueous solution containing sodium chloride, a chelating agent, and an alkaline agent. The hydrated beans are then dried, for example, by contact with air at 130°–170° F. Alternatively, the hydrated beans may be preserved by freezing, or by partial dehydration followed by holding at refrigeration or even ambient temperatures.

6 Claims, No Drawings

QUICK-COOKING SOYBEAN PRODUCTS

A nonexclusive, irrevocable, royalty free license in the invention herein described, throughout the world for all purposes of the United States Government, with the power to grant sublicenses for such purposes, is hereby granted to the Government of the United States of America.

This invention relates to and has among its objects the provision of processes for preparing quick-cooking soybeans. Further objects of the invention will be evident from the following description wherein parts and percentages are by weight unless otherwise specified.

It is recognized that there are serious food shortages in many parts of the world, particularly in India and the Far East. On the other hand, large tonnages of soybeans are grown in the United States, and it is recognized that soybeans have outstanding nutritive value, particularly because of their high protein content. An obvious plan of alleviation would involve exportation of these beans to the areas where food shortages exist. However, the matter is not that simple. The food-deficient areas also have deficiencies in fuels. Consequently, soybeans in their conventional state are not satisfactory—even after being soaked overnight, they must be cooked for such a long time (4–5 hours) to bring them to an edible state that an inordinate amount of fuel must be consumed in preparing them for the table. Another factor which militates against the use of soybeans in feeding programs is that they have a characteristic bitter taste which most people consider nauseating. In efforts to remedy this situation, various proposals have been made for precooking the beans to reduce their cooking time. Generally, these precooking procedures involve such expedients as heating the beans in boiling water or steam under atmospheric or superatmospheric pressure. Various problems are encountered in these known techniques, including nonuniformity of treatment, i.e., some of the treated beans will retain hard uncooked centers. Also, the precooking treatments invariably lead to splitting of the individual beans into separate halves. In some cases the precooking yields products which form a mush on being cooked and are thus only suitable for making soups.

In accordance with the invention, soybeans are made quick-cooking by a novel procedure not heretofore described or suggested and which obviates the problems outlined above. The products of the invention have a primary advantage in that they are quick-cooking. To prepare them for the table they are added to boiling water and after simmering for a period of about 15 to 55 minutes are tender and ready for consumption. Moreover, this quick-cooking character is attained without damage to the individual beans. They retain their original structure with no cracking, splitting, or butterflying. As a consequence, they have a very attractive appearance and, moreover, when cooked still retain the integral character in the original beans. Thus, the products of the invention are eminently suited for the preparation of dishes where the structure of the individual beans needs to be maintained. It is to be noted that in most varieties of soybeans, the skin offers particular resistance to softening during cooking. However, in the products of the invention, the skin as well as the cotelydons take up water readily and acquire a proper tenderness for eating with a very short cooking time. In addition to having the property of being quick-cooking and retaining their original structure, the products of the invention on cooking exhibit an excellent nutty flavor, they are free from the characteristic bitter flavor associated with conventional soybean products.

In a practice of the invention, raw soybeans are first contacted with boiling water for a brief period of time—about one-half to 2 minutes. This treatment with boiling water has the critical effect of modifying or conditioning the beans so that they will properly take up the hydrating medium used in the next step, even though this medium is applied at ambient temperature and atmospheric pressure. In the absence of this treatment with boiling water, the beans will not imbibe the medium to any useful extent even after standing in the medium for very long periods of time. It is important, moreover, in this first step that contact with boiling water be for a brief period of time, as stated. Where the time of treatment is so limited, the conditioning takes place properly and the beans remain intact—there is no rupturing or splitting of the kernels and even the skins are retained in place. These are, of course, desirable effects as the desideratum is to retain the integrity of the beans. Also, the skins exert a protective effect and it is desired that they remain intact in the final product. On the other hand, if the contact with boiling water were to be continued substantially longer than the stated time, the skins would slough off and the kernels would split. This would result in a product of unnatural appearance and, moreover, the cotelydons and embryos would be exposed to oxidative and other deleterious influence.

In a second step of the process of the invention, the conditioned soybeans are soaked for about 24 hours, at room temperature and at atmospheric pressure, in a special hydration medium. Although this medium is largely water, it contains certain additives which provide advantageous results that cannot be obtained with water alone. These useful results of the additives are exerted during the hydration (impregnation) step and subsequent thereto. Thus, since the additives are present in the medium which penetrates throughout the soybeans when they are hydrated, the additives can exert their desired activity at this stage. Moreover, since the additives stay in the beans even after the subsequent procedural steps, they remain distributed throughout the tissue where they can exert their influence in subsequent treatment of the products, for example, in storage, cooking, and consumption thereof.

A primary consideration is that the hydration medium contains one or more tenderizing agents. These agents contribute largely to the goal of attaining a product that is quick-cooking, i.e., one that can be prepared for the table by heating in water for a period of about 10 to 55 minutes. Thus, during the hydration step these agents cause a tenderizing of the bean tissue, particularly of the skins. Such action is, of course, very desirable because the skin exhibits an especially tough and impervious nature. Moreover, when the products of the invention are cooked, the tenderizing agents distributed in the tissue cooperate with the applied heat and moisture to cause a further and rapid tenderizing, yet without such a violent action as to cause any substantial sloughing or other physical disruption of the individual beans. Such a desirable action is attained by having present in the hydration medium, primarily the following: sodium chloride and a chelating agent. The sodium chloride has the principal effect of tenderizing the skins, and is also believed to assist in tenderizing proteinous components of the cotelydons. Usually, the sodium chloride is present in the hydrating medium in a concentration of about from 1 to 3 percent. The chelating agent exerts a variety of useful effects, including the following: (1) It softens the pellicle or skin. (2) It aids in the solubilization of proteins and starchy components. (3) It acts as a buffer to maintain pH. (4) It facilitates uniform penetration of the hydrating medium into the centers of the beans, so that the final products have a uniformly smooth texture. (5) It tends to lighten the color of the product. With respect to the last item, the following will further explain this point: As hereinafter explained, an alkali metal carbonate, or bicarbonate, is a desirable constituent of the hydrating medium of the invention. However, these alkaline agents may cause color changes in the pigmented outer layers of the beans. These undesired color changes are prevented when a chelating agent is present with the alkaline material; in such case the beans retain their normal light color. In a practice of the invention, various conventional chelating agents may be used such as the alkali metal salts of ethylenediamine tetraacetic acid (hereinafter referred to as EDTA), alkali metal pyrophosphates, tripolyphosphates, or citrates, etc. Generally, the chelating agent is added to the hydrating medium in a concentration of about from 0.1 to 5 percent. Particularly preferred is the conjoint use of sodium tripolyphosphate and tetrasodium EDTA—for example, 1 percent of the former; 0.5 percent of the latter—as providing especially good results coupled with a minimum amount of the chelating agents.

For best results, it is preferred that the hydrating medium be slightly alkaline, that is, have a pH of about 9. Depending on the chelating agent selected, this value may be attained directly, or it may be necessary to add an alkaline material, for example, sodium hydroxide, or more preferably, sodium carbonate and/or bicarbonate. The carbonate, or bicarbonate, not only acts as an alkaline agent and buffer but also acts as a protein dissociating, solubilizing or tenderizing agent. Particularly good results are attained with a mixture of sodium carbonate and sodium bicarbonate and the preferred form of the hydrating medium contains these components in concentrations of about 0.25 percent sodium carbonate and 0.75 percent sodium bicarbonate.

Optionally, the hydration medium may contain additional agents. For example, one may include a tract (about 0.01 to 0.05 percent) of a reducing agent such as sodium sulfide, cysteine, sodium mercaptoglycollate, or the like to assist in tenderizing the beans. An edible-grade surface-active agent such as polyoxyethylene sorbitan palmitate or stearate may be added in minor concentration (about 0.05-0.5 percent) to assist penetration of the medium into the seeds. Antioxidants, for example, butylated hydroxy anisole, butylated hydroxy toluene, ascorbyl palmitate, etc. may be added to the hydration medium for their fat-stabilizing effect. Although any such optional ingredients may be used, I have found that they are not critical and excellent products from the standpoints of color, flavor, stability, and ease of cooking are prepared wherein the hydration medium simply contains the basic ingredients: sodium chloride; a chelating agent such as an alkali metal salt of EDTA or sodium tripolyphosphate; and an alkaline agent such as a mixture of sodium carbonate and bicarbonate. Preferably, however, the medium also contains a minor proportion of an antimicrobial agent to prevent any molding of the beans in the period in which they are soaked in the medium. For this purpose one may employ such agents as sodium sorbate, sodium benzoate, or the lower alkyl esters of parahydroxybenzoic acid, the latter being preferred.

After the beans are hydrated, they may be washed with water to remove the hydrating medium from their surfaces. This washing is conveniently carried out by placing the hydrated beans on a screen and spraying them with water. However, washing is an optional step and may be omitted.

Following washing, or directly after hydration, the beans are treated to put them in a condition whereby they may be shipped and stored without spoiling. Generally, dehydration is preferred as the most economical method of preservation. The dehydration can be accomplished with any of the conventional dryers used with food products. For example, a tray dryer can be used where the beans are spread on trays and exposed to a crossflow or throughflow of air at about 130–170° F. Another example is the use of a column-type dryer wherein the beans cascade over a baffle arrangement while exposed to a current of hot air. If desired, the drying may be conducted in stages, that is, a portion of the moisture content is removed in one stage, the material allowed to stand to permit equilibration of moisture and further drying and equilibration are repeated as necessary. Such stepwise drying is generally preferable as avoiding internal strains and thus preventing any rupture of individual kernels. In any event, the drying is continued until the product contains about 10 percent moisture.

Alternatively, the hydrated grains may be preserved by freezing. This is conveniently effected by placing the beans on trays and exposing them to refrigerated air. Generally, the air temperature and conditions of treatment (e.g., rate of airflow) are selected so that the freezing takes place rapidly. Generally, an air temperature of less than 0° F. is used and circulation of the air is rapid enough to get freezing in a short time, i.e., 5 minutes or less. The frozen product is then packaged in conventional manner and kept in frozen storage until used. For especially rapid freezing, the beans may be immersed in a cold liquid medium instead of being exposed to cold air. Especially useful in this connection is the technique of plunging the beans into liquid nitrogen whereby they become frozen almost instantaneously. The frozen product is then packaged and held in frozen storage as described. If desired, the treated beans may be packaged first and then frozen in conventional equipment such as a plate freezer.

In another alternative procedure, the hydrated beans are preserved by partial dehydration followed by holding at refrigerator temperatures. For example, the hydrated beans are dehydrated to a moisture content of 20–35 percent, then packaged—in transparent plastic bags, for instance—and held at temperatures of about 40° F. until they are ready to be consumed.

The invention is further demonstrated by the following illustrative examples:

A solution was prepared having the following composition:

| Ingredient | Amount, percent |
| --- | --- |
| Sodium chloride | 2.5 |
| Sodium tripolyphosphate | 0.5 |
| Sodium bicarbonate | 0.75 |
| Sodium carbonate | 0.25 |
| Methyl parahydroxybenzoate | 0.025 |
| Propyl parahydroxybenzoate | 0.025 |

The pH of the solution was 9.0.

Lots of soybeans of different varieties were each subjected to the following treatments: The beans were held in boiling water for 1 minute. The conditioned beans were then placed in the hydrating solution as described above and allowed to soak therein, at room temperature and atmospheric pressure, for a period of 24 hours. The soaked beans were removed from the solution, drained, and divided into two portions. One portion was dehydrated by exposing it on trays to a current of air at about 150° F. for a period long enough to reduce the moisture content of the beans to 10 percent. The other portion was frozen.

The dehydrated and frozen products were then tested for cooking quality. To this end, each sample was added to boiling water and simmered until the products reached a standard tenderness, typical of properly cooked beans. As controls, samples of the original (untreated) soybeans were soaked in distilled water overnight at room temperature, and tested for cooking quality. The results obtained are tabulated below:

| Run | Soybean variety | Treatment after hydration | Cooking time*, min. |
| --- | --- | --- | --- |
| 1 | Lee | dehydrated | 40 to 55 |
| 2 | do. | frozen | 20 to 30 |
| 3 (control) | do. | — | 300 |
| 4 | Kanrrich | dehydrated | 25 to 35 |
| 5 | do. | frozen 11 | 15 to 25 |
| 6 (control) | do. | — | 270 |
| 7 | Hawkeye | dehydrated | 30 to 40 |
| 8 | do. | frozen | 15 to 25 |
| 9 (control) | do. | — | 240 |
| 10 | Jackson yellow | dehydrated | 25 to 35 |
| 11 | do. | frozen | 10 to 15 |
| 12 (control) | do. | — | 220 |

*In the cooking tests applied to the products of the invention—runs 1, 2, 4, 5, 7, 8, 10, and 11—the first time FIGURE refers to the earliest edible stage, the second when the beans were completely soft with no noticeable skin toughness.

Taste tests of the cooked products of the invention (Runs 1, 2, 4, 5, 7, 8, 10, and 11), indicated that they were free from bitterness; they had an excellent nutty flavor, and the beans were essentially intact with no significant mushing or sloughing. In contrast, the cooked controls (Runs 3, 6, 9, and 12) had a very unpleasant bitter taste and the skins were somewhat fibrous.

Having thus described the invention, what is claimed is:

1. A process for treating soybeans to remove bitterness and to make them quick-cooking while retaining the integrity of the beans, which consists of:

a. contacting raw soybeans with boiling water at atmospheric pressure and at a temperature of about 212° F. for a period of about one-half to 2 minutes, and
b. soaking the so-treated soybeans for about 24 hours at room temperature and atmospheric pressure, in an aqueous hydration medium containing sodium chloride in a concentration of about 1 to 3 percent, a chelating agent in a concentration of about 0.1 to 5 percent, and having a slightly alkaline pH.

2. The process of claim 1 wherein the soaked soybeans are dehydrated.

3. The process of claim 1 wherein the soaked soybeans are frozen.

4. The process of claim 1 wherein the soaked soybeans are partially dehydrated and held at refrigeration temperatures.

5. The process of claim 1 wherein the aqueous hydration medium contains water and the following ingredients:

| | |
|---|---|
| sodium chloride | about 2.5% |
| sodium tripolyphosphate | about 0.5% |
| sodium bicarbonate | about 0.75% |
| sodium carbonate | about 0.25% |

6. The process of claim 1 wherein the aqueous hydration medium contains water and the following ingredients:

| | |
|---|---|
| sodium chloride | about 2.5% |
| sodium tripolyphosphate | about 0.5% |
| sodium bicarbonate | about 0.75% |
| sodium carbonate | about 0.25% |
| methyl parahydroxybenzoate | about 0.025% |
| propyl parahydroxybenzoate | about 0.025% |

* * * * *